US012273322B2

(12) United States Patent
Mankala et al.

(10) Patent No.: US 12,273,322 B2
(45) Date of Patent: Apr. 8, 2025

(54) FIREWALL RULE AND DATA FLOW ANALYSIS AND MODIFICATION

(71) Applicant: Microsoft Technology Licensing, LLC, Redmond, WA (US)

(72) Inventors: Sai Sujith Reddy Mankala, Milpitas, CA (US); Lisette Paloma Hamilton, Redwood City, CA (US); Mark Gakman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 17/844,587

(22) Filed: Jun. 20, 2022

(65) Prior Publication Data

US 2023/0412565 A1 Dec. 21, 2023

(51) Int. Cl.
*H04L 9/40* (2022.01)
*G06F 3/0482* (2013.01)
*H04L 47/2483* (2022.01)
*H04L 67/75* (2022.01)

(52) U.S. Cl.
CPC ........ *H04L 63/0263* (2013.01); *G06F 3/0482* (2013.01); *H04L 47/2483* (2013.01); *H04L 67/75* (2022.05)

(58) Field of Classification Search
CPC . H04L 63/0263; H04L 47/2483; H04L 67/75; G06F 3/0482
See application file for complete search history.

(56) References Cited

U.S. PATENT DOCUMENTS

| 2009/0249472 A1* | 10/2009 | Litvin ................. H04L 63/0263 |
| | | 726/14 |
| 2014/0164595 A1* | 6/2014 | Bray ....................... H04L 43/06 |
| | | 709/224 |
| 2018/0176185 A1* | 6/2018 | Kumar ................ H04L 63/0236 |

(Continued)

FOREIGN PATENT DOCUMENTS

| CN | 104717188 A | 6/2015 |
| CN | 112532633 A | 4/2022 |

OTHER PUBLICATIONS

"International Search Report and Written Opinion Issued in PCT Application No. PCT/US23/022523", Mailed Date: Aug. 9, 2023, 15 Pages.

*Primary Examiner* — Bruce S Ashley
(74) *Attorney, Agent, or Firm* — Schwegman Lundberg & Woessner, P.A.

(57) ABSTRACT

One embodiment includes retrieving firewall flow log data that indicates whether a flow was allowed or denied, an identifier of a rule that allowed or denied the flow, a source port, a protocol, a destination port, a source IP or FQDN, and a destination IP or FQDN. The method continues with processing the firewall flow log data, such as by identifying and counting occurrences of unique flows and counting flows allowed or denied by each rule. The method further includes generating a recommendation of at least one of limiting an existing rule, deleting an existing rule, and modifying rule application precedence. The recommendation may be generated based on at least one of the occurrences of unique flows and counted flows allowed or denied by each rule of a rule base. This method also includes providing the recommendation within a user interface as a selectable option for implementation.

19 Claims, 8 Drawing Sheets

(56) References Cited

U.S. PATENT DOCUMENTS

| | | |
|---|---|---|
| 2020/0329011 A1 | 10/2020 | Cai et al. |
| 2021/0226920 A1* | 7/2021 | Ahn .................. G06F 21/562 |
| 2021/0320903 A1 | 10/2021 | Kalaycilar et al. |

* cited by examiner

Select A Rule

| Rule Name | Collection Group | Priority | Collection | Priority | Rule Type | Action |
|---|---|---|---|---|---|---|
| ssh-rule | DefaultDraftRuleCollectionGroup | | 100 Rdprc | 200 | NatRule | Dnat |
| allownetrule | DefaultNetworkRuleCollectionGroup | | 200 allownetrc | 300 | NetworkRule | Allow |
| port9090 | DefaultNetworkRuleCollectionGroup | | 200 allownetrc | 300 | NetworkRule | Allow |
| allowgoogle | DefaultApplicationRuleCollectionGroup | | 300 AllowRc | 600 | ApplicationRule | Allow |
| allowmsft | DefaultApplicationRuleCollectionGroup | | 300 AllowRc | 600 | ApplicationRule | Allow |
| allowcnn | DefaultApplicationRuleCollectionGroup | | 300 AllowRc | 600 | ApplicationRule | Allow |
| allowwalmart | DefaultApplicationRuleCollectionGroup | | 300 AllowRc | 600 | ApplicationRule | Allow |
| allowpinterest | DefaultApplicationRuleCollectionGroup | | 300 AllowRc | 600 | ApplicationRule | Allow |
| DenyeBay | DefaultApplicationRuleCollectionGroup | | 300 AllowRc | 700 | ApplicationRule | Deny |
| Allow-all | DefaultApplicationRuleCollectionGroup | | 300 Allow-all | 800 | ApplicationRule | Allow |

*FIG. 2*

FIREWALL RULE AND DATA FLOW ANALYSIS AND MODIFICATION

BACKGROUND

Analyzing network traffic flows on networking devices such as firewalls is a complex task. The analysis generally involves processing Transmission Control Protocol (TCP) log files taken in a large dump from a firewall that includes an entry for every packet that has reached the firewall. Each flow is identified using a 5-tuple (source port, protocol, destination port, source Internet Protocol address which is often referred to as an IP, destination IP) and the flows which are distinct with a specific 5-tuple are often in a non-contiguous fashion. Analyzing the flows to find a pattern is a complex and time-consuming task as a typical TCP log file has hundreds of thousands of flows represented therein. Analyzing becomes further cumbersome for less technically savvy customers and those not well-versed in making an informed decision based on the captures. As a result, firewalls are often less secure than desired and customer abilities to improve security and firewall performance are hampered by the current and ever-increasing levels of network traffic.

SUMMARY

The various embodiments herein provide solutions to make the process of improving firewall configuration quality, including analysis, solution identification, and implementation much easier, often with a single click in a browser or other user interface. These embodiments are applicable to most, if not all, rule-based firewalls that are user configurable.

One example method embodiment includes retrieving firewall flow log data. The firewall flow log data includes data indicating whether a flow was allowed or denied, an identifier of a rule that allowed or denied the flow, a source port, a protocol, a destination port, a source IP or Fully Qualified Domain Name (FQDN), and a destination IP or FQDN. The method continues with processing the firewall flow log data, such as by identifying and counting occurrences of unique flows and counting flows allowed or denied by each rule. The method further includes generating a recommendation of at least one of limiting an existing rule, deleting an existing rule, and modifying rule application precedence. The recommendation may be generated based on at least one of the occurrences of unique flows and counted flows allowed or denied by each rule of a rule base. This method also includes providing the recommendation within a user interface as a selectable option for implementation.

Another method embodiment includes presenting, in a user interface, a list of rules defined on a firewall that instruct the firewall on whether to allow or deny a specific packet of data. Each of these rules typically includes a property to allow or deny data and a 5-tuple including a source port, a protocol, a destination port, a source IP or FQDN, and a destination IP or FQDN. This method may then receive a selection of a rule included in the presented user interface upon which to perform analysis and then retrieve firewall flow log data associated with the selected rule. The data of a flow generally includes data indicating whether the flow was allowed or denied, an identifier of the select rule that allowed or denied the flow, and 5-tuple data. The method continues with processing the firewall flow log data by identifying and counting occurrences of unique flows by unique 5-tuple values. Subsequently the method includes generating a recommendation based on at least one of the occurrences of unique flows and counted flows allowed or denied by each rule of a rule base. The generated recommendation may include at least one of limiting allowances or denials of the selected rule to fewer 5-tuple values, deleting or deactivating the selected rule, and modifying application precedence of the selected rule. Subsequently, the user interface is updated to include a view of the processed firewall flow log data and selectable user interface items for each of the generated recommendations. Selection of a one of the selectable user interface items generates a system command to implement the selected recommendation on the firewall.

A further embodiment is in the form of a system. The system of this embodiment includes a processor, a network interface device, and a memory storing instructions executable by the processor to perform data processing activities. The data processing activities may include generating user interface data renderable on a user device as a user interface to present a list of rules defined on a firewall that instruct the firewall on whether to allow or deny a specific packet of data. Each of such rules includes a property to allow or deny data a 5-tuple including a source port, a protocol, a destination port, a source IP or FQDN, and a destination IP or FQDN. The data processing activities further include transmitting the user interface data to a user device via the network interface device and receiving, via the network interface device, a selection of a rule included in the presented user interface upon which to perform analysis. The data processing activities also include retrieving, via the network interface device, firewall flow log data associated with the selected rule, the data of a flow including data indicating whether the flow was allowed or denied, an identifier of the select rule that allowed or denied the flow, and 5-tuple data. The data processing activities may then proceed with processing the firewall flow log data by identifying and counting occurrences of unique flows by unique 5-tuple values. The data processing activities also involve generating a recommendation based on at least one of the occurrences of unique flows and counted flows allowed or denied by each rule of a rule base. The recommendation may include one or more recommendations of limiting allowances or denials of the selected rule to fewer 5-tuple values, deleting or deactivate the selected rule, and modifying application precedence of the selected rule. Eventually the data processing activities update the user interface data, by transmitting further user interface data via the network interface device to the user device, to render a view of the processed firewall flow log data and selectable user interface items for each of the generated recommendations. Selection of the user interface items, when rendered, may generate a system command to implement the selected recommendation on the firewall.

BRIEF DESCRIPTION OF THE DRAWINGS

FIG. 2 is a user interface diagram, according to an example embodiment.

DETAILED DESCRIPTION

The various embodiments herein provide solutions to make the process of improving firewall configuration quality, including analysis, solution identification, and implementation much easier, often with a single click in a browser or other user interface. These embodiments are applicable to most, if not all, rule-based firewalls that are user configurable.

The embodiments herein use rules defined within a firewall to analyze flows to identify network traffic patterns and to provide user intuitive recommendations for improvement. The rules in such firewalls determine whether a specific packet of data, also referred to as a flow, should be allowed or be denied. A typical firewall rule includes a 5-tuple (source port, protocol, destination port, source IP, and destination IP) and a property to allow or deny flows that match the 5-tuple. One or both source and destination IPs of a 5-tuple may instead be a Fully Qualified domain (FQDN) that is resolvable to an IP, such as through a domain name service (DNS). In some embodiments, each rule can be extended to include a range of one or more of the 5-tuple elements, such as through use of a wildcard character indicating all values, an express range, a list of values, and the like. Such embodiments enable users to analyze the part of a selected rule matching actual firewall traffic and provide an approach to update the rule.

Updates to rules may be made, such as in a default-deny firewall configuration, to remove portions of rules that have not been implicated by any traffic within a period and thereby removing the rule is unlikely to have any adverse impact. Such updates may also include modifying an entire rule or a portion therein, such as certain IPs, higher or lower priority for consideration by the firewall to match the frequency of occurrence of such traffic more closely. For example, a rule rarely involved in allowing or denying firewall traffic may be given a lower priority while a rule that is often involved in allowing or denying firewall traffic may be given a higher priority. Organizing rules in such a manner improves efficiency of firewall flow processing by making an allowance or denial of the most commonly occurring flows earlier in the processing.

One example embodiment starts with a user viewing a listing of rules on a firewall within user interface, such as may be presented in a web browser. An example embodiment of such a user interface is provided in FIG. 2. The user continues by selecting each rule on the firewall on which to perform the analysis. The analysis may be triggered by a single click. In some embodiments, the analysis is performed on real-time traffic, but this is further customizable or selectable to perform the analysis on a time period, such as a period ranging from 1 hour to 90 days of data.

Figure 3:
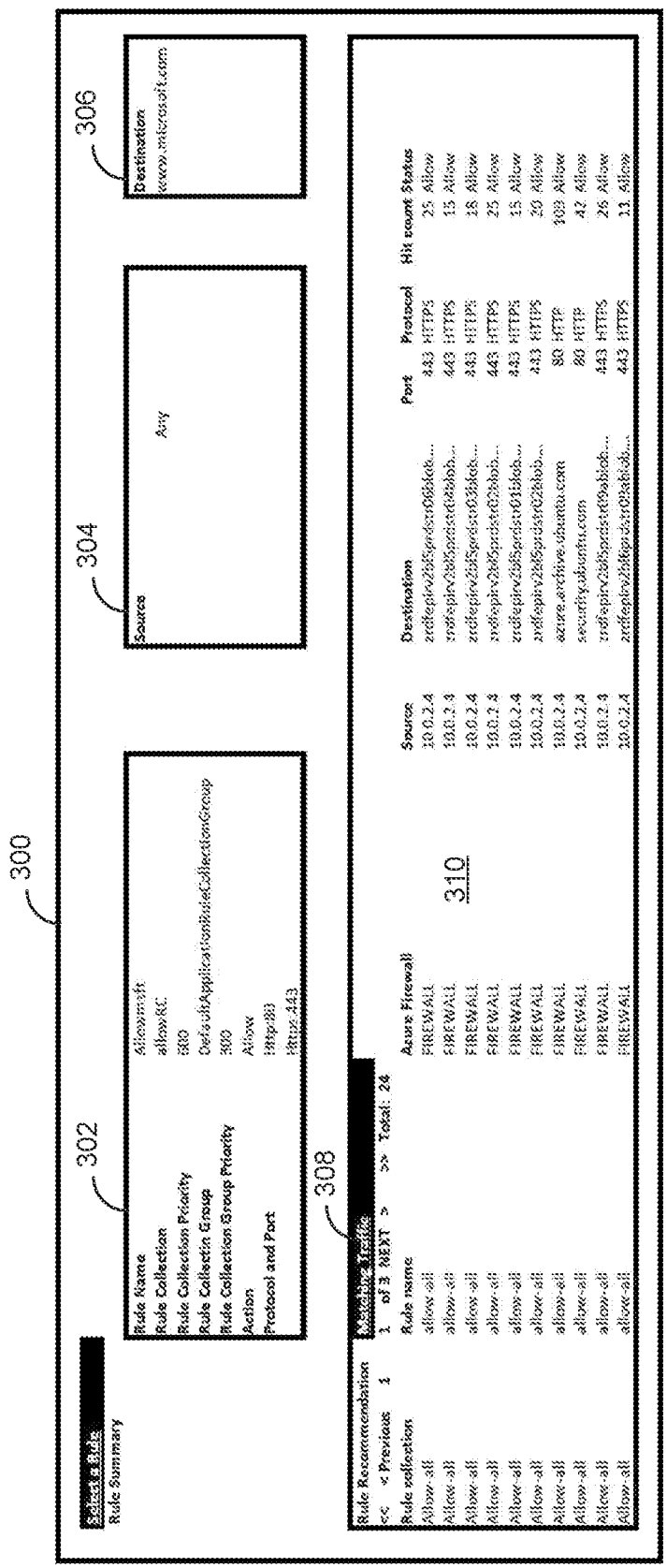
FIG. 3 is a user interface diagram, according to an example embodiment.

The user interface in these embodiments presents the traffic matching the firewall in the specified timeline. An example of this user interface, according to one embodiment, is illustrated in FIG. 3. The analysis shows the usage of the rule by each value of the 5-tuple. For example, the 5-tuple may show the traffic all from a single source IP but with ten different destination IPs and a count of times the flow occurred for each of the ten different destination IPs.

Figure 4:
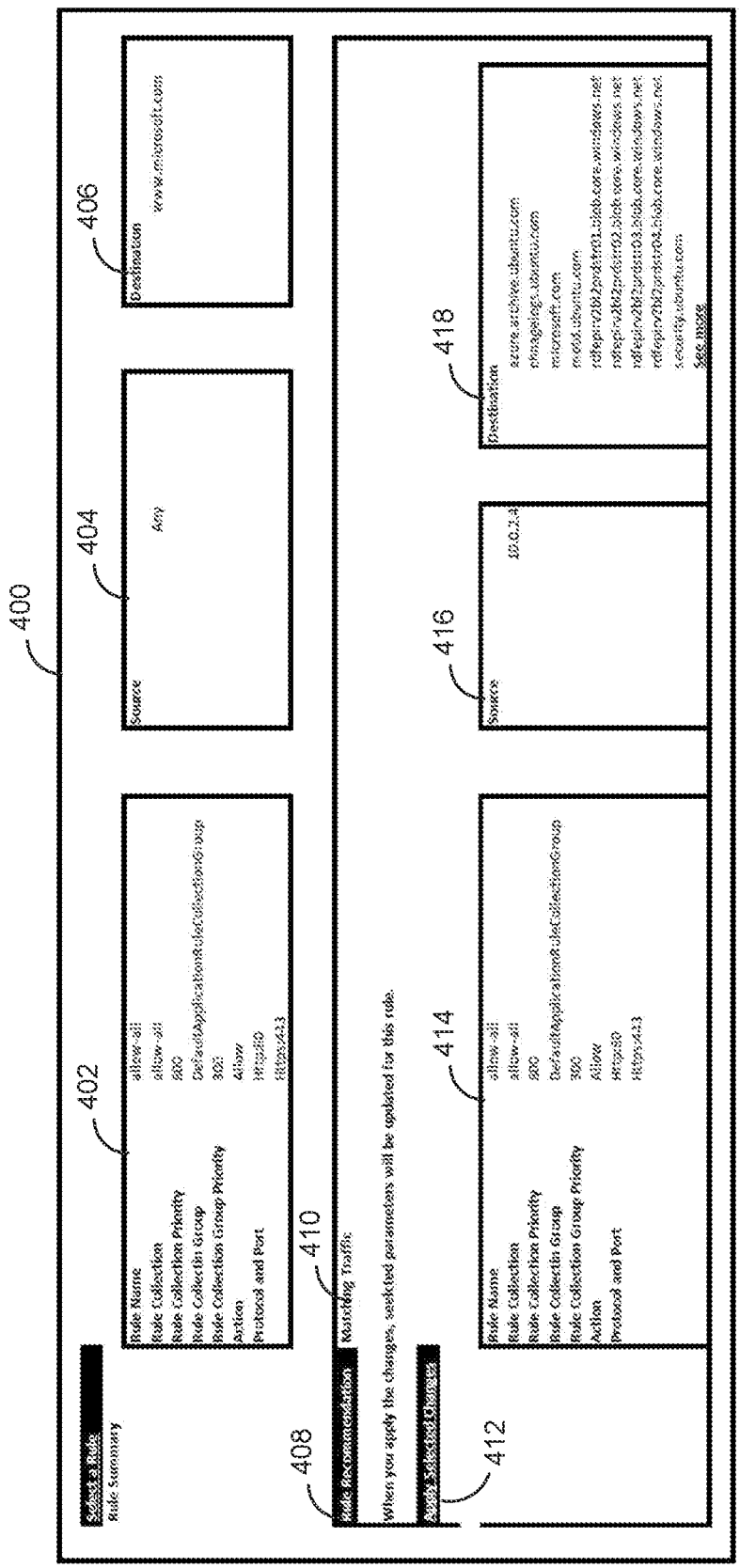
FIG. 4 is a user interface diagram, according to an example embodiment.
Figure 5:
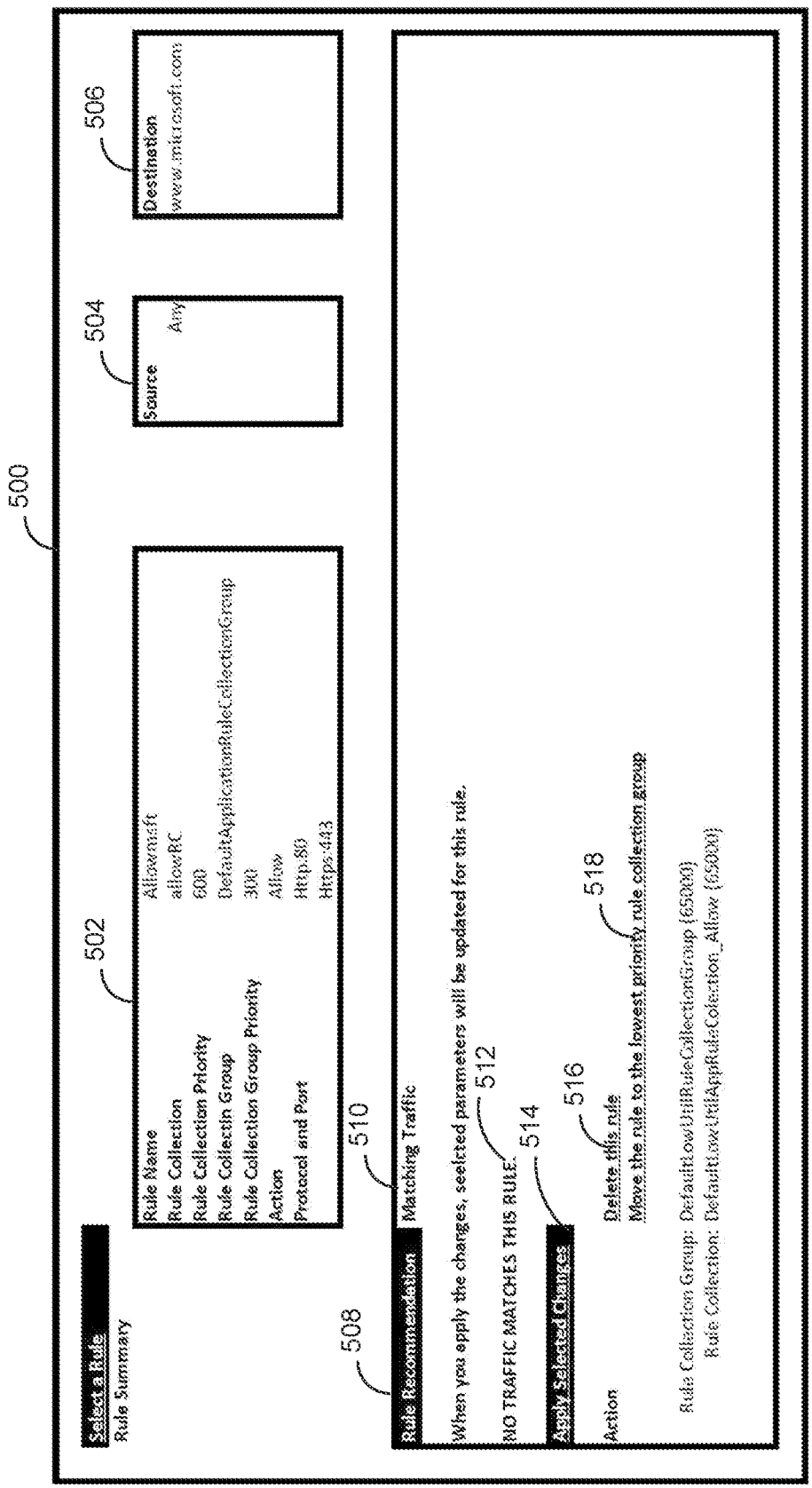
FIG. 5 is a user interface diagram, according to an example embodiment.

In such embodiments and based on the analysis, the user interface shows the recommendations with an option to apply the recommendations with a single click, such as in the user interface example embodiments illustrated in FIG. 4 and FIG. 5. In some embodiments, the recommendations can come in three different formats. One format recommends the update of the rule to remove the unused configurations like the IP address or a port. Another format of the recommendation is to suggest a deletion of the rule if the rule is never utilized. The third format is to suggest lowering the priority of the rule for a later use or increasing the priority for earlier use.

Continuing with the example of the ten different destination IPs from above, the analysis may reveal the rule allows all traffic from the source IP on a particular protocol and port to pass to any destination IP. The recommendation in this instance may be to allow the flow only to the ten different destination IPs and deny flows to all other destination IPs. An option may be presented to implement the recommendation with a single user interface element selection, such as a single click. At the same time, another embodiment may provide an additional option to modify the recommendation, such as to apply only a portion of the recommendation by manually specifying how a 5-tuple of a rule is to be modified.

Other analysis may be made and recommendations provided in the various embodiments. Further detail of these and other embodiments is illustrated in the figures and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
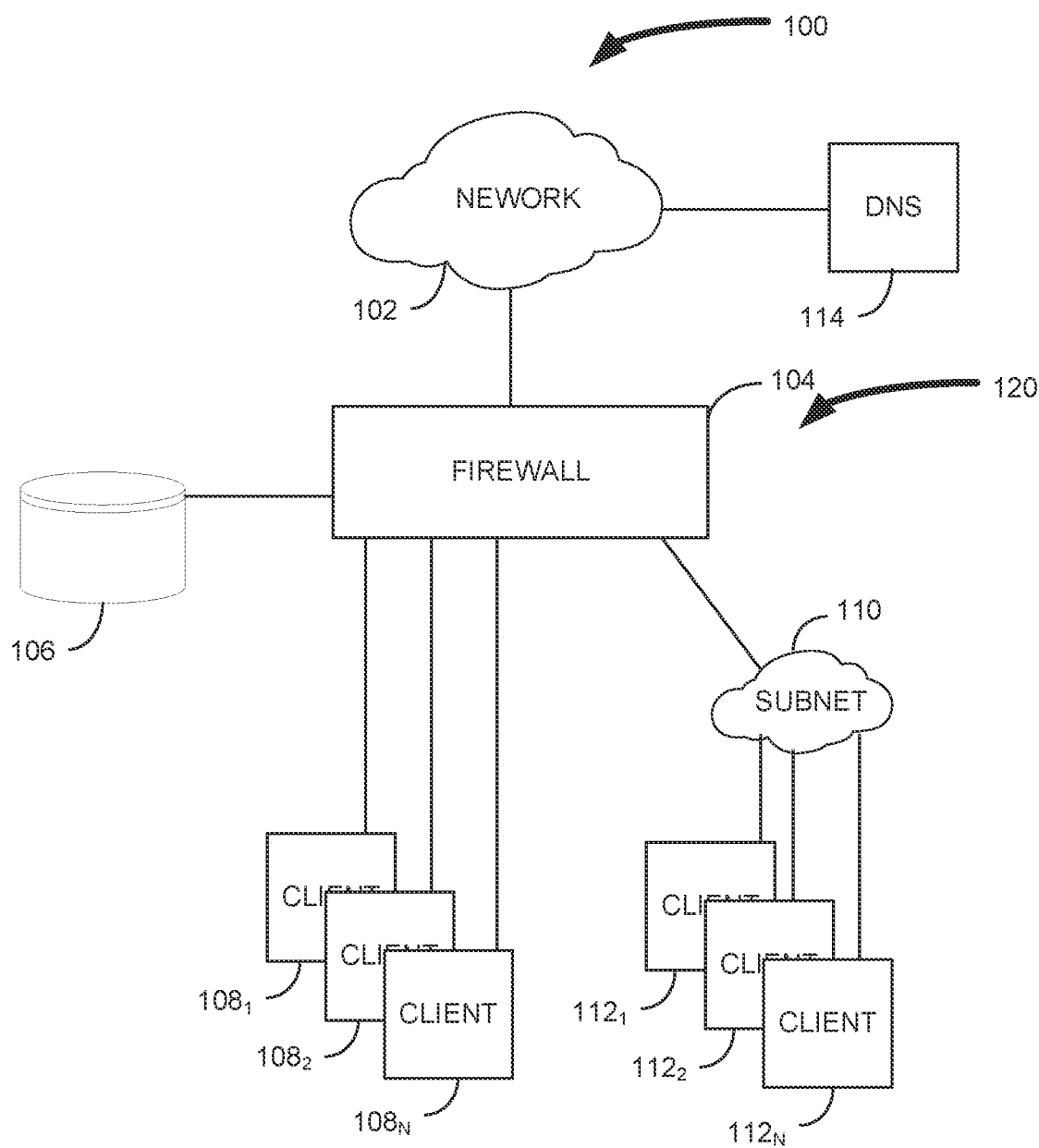
FIG. 1 is a diagram of a networked computing environment, according to an example embodiment.

FIG. 1 is a diagram of a networked computing environment 100, according to an example embodiment. The networked computer environment includes a firewall 104, a network 102 outside the firewall 104, and a network 120 inside the firewall 104 that is protected thereby. The network 102 outside the firewall 104 may be or include the Internet. The network 120 inside the firewall 104 is typically a network of an entity, such as a company or governmental entity. The firewall 104 may be a software element deployed on one or more virtual machines, software deployed on a server, software that executes on a router, an appliance-type firewall device, or other hardware or virtual machine arrangement.

In some embodiments, the firewall 104 is the only firewall. However, in other embodiments, the firewall 104 is but one of a plurality of firewalls that protect a larger or even distributed networked environment.

The firewall 104 operates to protect network 120 assets, such as clients 1081-N, subnetwork 110, and client $112_{1-N}$, from nefarious or other network traffic that may lead to exposure of information, data, software, or harmful code in either direction through the firewall 104. The firewall 104 may be configured in a "default deny" manner, meaning that the firewall 104 does not allow network traffic to pass into the network 120 unless it is expressly allowed by a rule. The rules generally include a 5-tuple identifying a source port, a protocol, a destination port, a source IP or FQDN, and a destination IP or FQDN. An FQDN, if used, may be resolved by the firewall 104 via a domain name service (DNS) 114 accessible via the external network 102, but could also be resolved utilizing a different DNS or cached data obtained therefrom that may be stored in memory or in storage 106. Some rules may include a range of any of the 5-tuple elements and may even include a wildcard character to encompass all values for an entire 5-tuple element or a portion thereof, e.g., one or more segments of IP addresses that may be expressed as 192.68.212.*. Rules, in some embodiments, also include an indicator of whether to allow or deny flows implicated by the rule.

The firewall 104 may store rules in memory or in storage 106. The firewall also generates a log entry for each flow that reaches the firewall 104. A firewall 104 log entry will record data such as the 5-tuple data of the flow, an indication whether the data was allowed or denied, and an identifier of the rule upon which the decision was made. In some embodiments, the log may also include an indicator of whether the flow was diverted or simultaneously copied and routed to a sandbox network area for further evaluation or other consideration.

A configuration of the firewall 104 may be stored in storage 106 and be accessed and manipulated from one or more of the clients 1081-N and $112_{1-N}$. Manipulation of the firewall 104 setting may be direct to the firewall 104 via user interface elements served by configuration element that reside and execute on the firewall 104 itself. In other embodiments, the firewall 104 may receive configuration updates from data stored thereto or accessible from other network 102, 120 locations. Such updates may be made within and published to the firewall 104 by a configuration management software system deployed by an organization implementing the computing environment 100.

FIG. 2 is a user interface 200 diagram, according to an example embodiment. The user interface 200 is one embodiment of a user interface within which firewall rules are listed along with some details of the listed rules. A rule selected within the user interface 200, such as rule 202, for analysis, as may be presented in the user interface 300 of FIG. 3. Further, the rule 202 may be selected to obtain recommendations with regard thereto as may be presented within the user infaces 400 and 500 of FIG. 4 and FIG. 5, respectively.

FIG. 3 is a user interface 300 diagram, according to an example embodiment. The user interface 300 is an example of a user interface within which firewall rule analysis may be viewed. The user interface 300, according to the example embodiment presents rule parameters in panes 302, 304, and 306. When the "Matching Traffic" tab 308 is selected, a detail pane 310 presents flow analysis data that aggregates matching flows and provides a count and a status of how aggregated matching flows were processed. The flow analysis data includes information for flows processed by each rule on a subject firewall(s). The flow analysis data, as illustrated, includes a rule collection within which a rule applied to matching flows is included, a name of the rule that processed the matching flows, an identifier of the firewall that processed the matching flows, source and destination IPs or FQDNs of matching flows, and port, protocol, and count of matching flows processed on the firewall. Also included is a status of how the matching flows were processed, i.e., allow or deny.

Data presented in the detail pane 310 may be sorted by selecting the various column headings. Note however that when there have been no flows processed within a subject period, no data would be presented in the detail pane 310.

FIG. 4 is a user interface 400 diagram, according to an example embodiment. The user interface 400, according to the example embodiment, presents current rule parameters in panes 402, 404, and 406. The user interface 400 also includes recommended rule parameters in panes 414, 416, and 418. The rule presented in the user interface 400 is rule for which there were flows presented in the matching traffic user interface, such as the user interface 300 of FIG. 3 that is viewable though selection of the Matching Traffic tab 410.

Rule recommendations may be viewed upon selecting the Rule Recommendation tab 408. The rule recommendations may be arrived at by underlying algorithms that identify unutilized rules, rules that are implicated by flows only to a small number of IPs or FQDNs, rules that have a high priority in application precedence but have lower counts than other rules, and the like. Also selectable in the user interface 400 is the Matching Traffic tab 410

Rule recommendations in some embodiments are premised on a "default deny" strategy to only allow traffic that is expected and to block other traffic that is not expected. Should an issue arise with a blocked flow, requests may be submitted through separate channels and the desired flow added to a rule to allow future occurrences.

Although only a single recommendation is presented in user interface 400, multiple recommendations may be presented in other embodiments and accepted recommendations selected. Rule recommendation desired for implementation may be selected and implemented through selection of a user interface element, such as the illustrated "Apply Selected Changes" button 412. Selection of the button 412 will cause commands to be sent to the firewall to make configuration changes to implement the selected recommendation(s).

FIG. 5 is a user interface 500 diagram, according to an example embodiment. The user interface 500, according to the example embodiment, presents current rule parameters in panes 502, 504, and 506. The rule presented in the user interface 500 is rule for which there were no flows presented in the matching traffic user interface, such as the user interface 300 of FIG. 3 that is viewable though selection of the Matching Traffic tab 510. As the Rule Recommendation tab 508 is selected, the user interface instead indicates at 512 that there is not traffic matching this rule and is presenting appropriate recommendations. These recommendations include a recommendation to delete this rule 516 or to move the rule to the lowest priority rule collection group 518. Once a recommendation is selected, the user may select the Apply Selected Changes user interface element 514, such as a button. This selection will cause commands to be sent to the firewall to make configuration changes to implement the selected recommendation(s).

Figure 6:
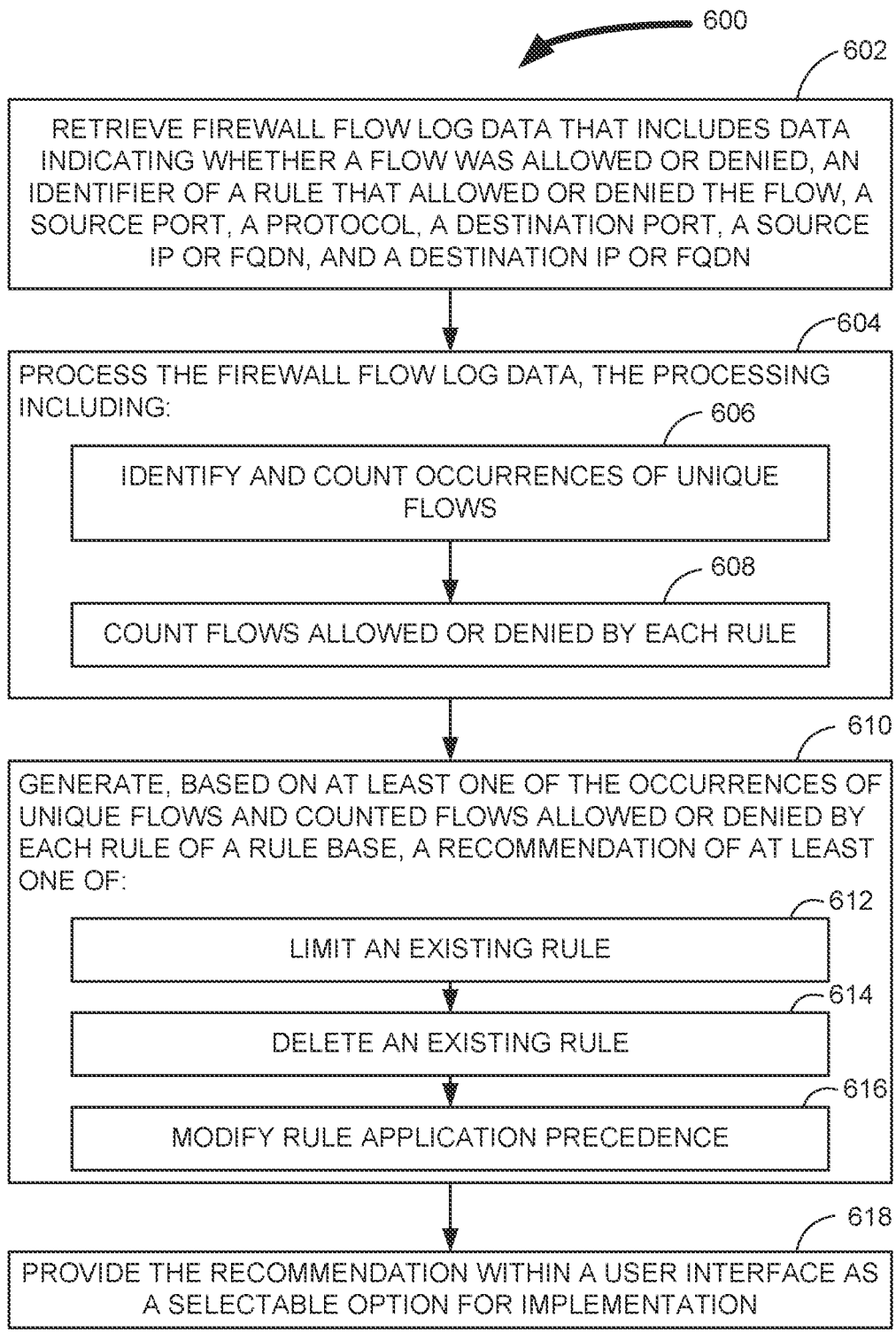
FIG. 6 is a block flow diagram of a method, according to an example embodiment.

FIG. 6 is a block flow diagram of a method 600, according to an example embodiment. The method 600 is an example of a method performed for firewall rule and data flow analysis and modification, according to some embodiments.

The method 600 includes retrieving 602 firewall flow log data. The firewall flow log data in some embodiments includes data indicating whether a flow was allowed or denied, an identifier of a rule that allowed or denied the flow, a source port, a protocol, a destination port, a source IP or FQDN, and a destination IP or FQDN. The method 600 further includes processing 604 the firewall flow log data. In some embodiments, the processing 604 includes identifying 606 and counting occurrences of unique flows and counting 608 flows allowed or denied by each rule.

The method 600 further includes generating 610, based on at least one of the identified 606 and counted occurrences of unique flows and counted 608 flows allowed or denied by each rule of a rule base, a recommendation. The generated 610 recommendation includes at least one of limiting 612 an existing rule, deleting 614 an existing rule, and modifying 616 rule application precedence. The method 600 may then provide 618 the recommendation within a user interface as a selectable option for implementation.

In some embodiments, the recommendation to modify 616 the rule application precedence is generated 610 by ordering rules in the rule base in descending order from a highest count of flows allowed or denied by a rule and comparing the ordered rules with a current firewall rule application precedence configuration. The method 600 in such embodiment may then proceed with identifying a rule in the ordered rules that has a different location in the ordered rules than in the current firewall rule application precedence configuration and generating the recommendation for at least one rule to modify rule application precedence of the firewall rule application precedence configuration. In such embodiments, the rule application precedence sets an order for the firewall to apply the rules. Setting the order in such a manner causes the rules that are more likely to be applicable to be considered first. Once a rule is found to be applicable to a flow and it is applied, consideration of the flow is complete. Thus, processing of a flow is reduced when an applicable rule is identified earlier in consideration of the rule. The processing benefits can be quite significant as every flow is considered by the firewall.

In some embodiments of the method 600, a recommendation to delete 614 an existing rule is identified when an existing rule has not been applied to allow or deny a flow for a configurable period, such as 90 or 180 days. In some embodiments, rather than deleting such a rule, the recommendation may instead be to deactivate the rule, thereby keeping the rule in the rule base, but removing the rule from consideration.

In some further embodiments, a recommendation to limit 612 an existing rule is identified by identifying rules with broad allowance configurations that have been applied to allow flows to a small number of source ports, protocols, destination ports, source IPs or FQDNs, and destination IPs or FQDNs. Such rules allow more flow traffic to pass through the firewall than is needed and thereby provides a broader profile for attack than needed. Thus, the method 600 in such embodiments includes generating a recommendation to change the identified rules to only allow flows more closely limited to those involving one or more of the small number of source ports, protocols, destination ports, source IPs or FQDNs, and destination IPs or FQDNs.

In some embodiments, the method 600 is performed in response to selection of a rule and the method is performed only with regard to the selected rule such that the firewall flow log data is retrieved only for flows allowed or denied by the selected rule. In some embodiments, the user interface is a dataset renderable on a user device, such as within a web browser or within an app that executes on a mobile or other device.

Figure 7:
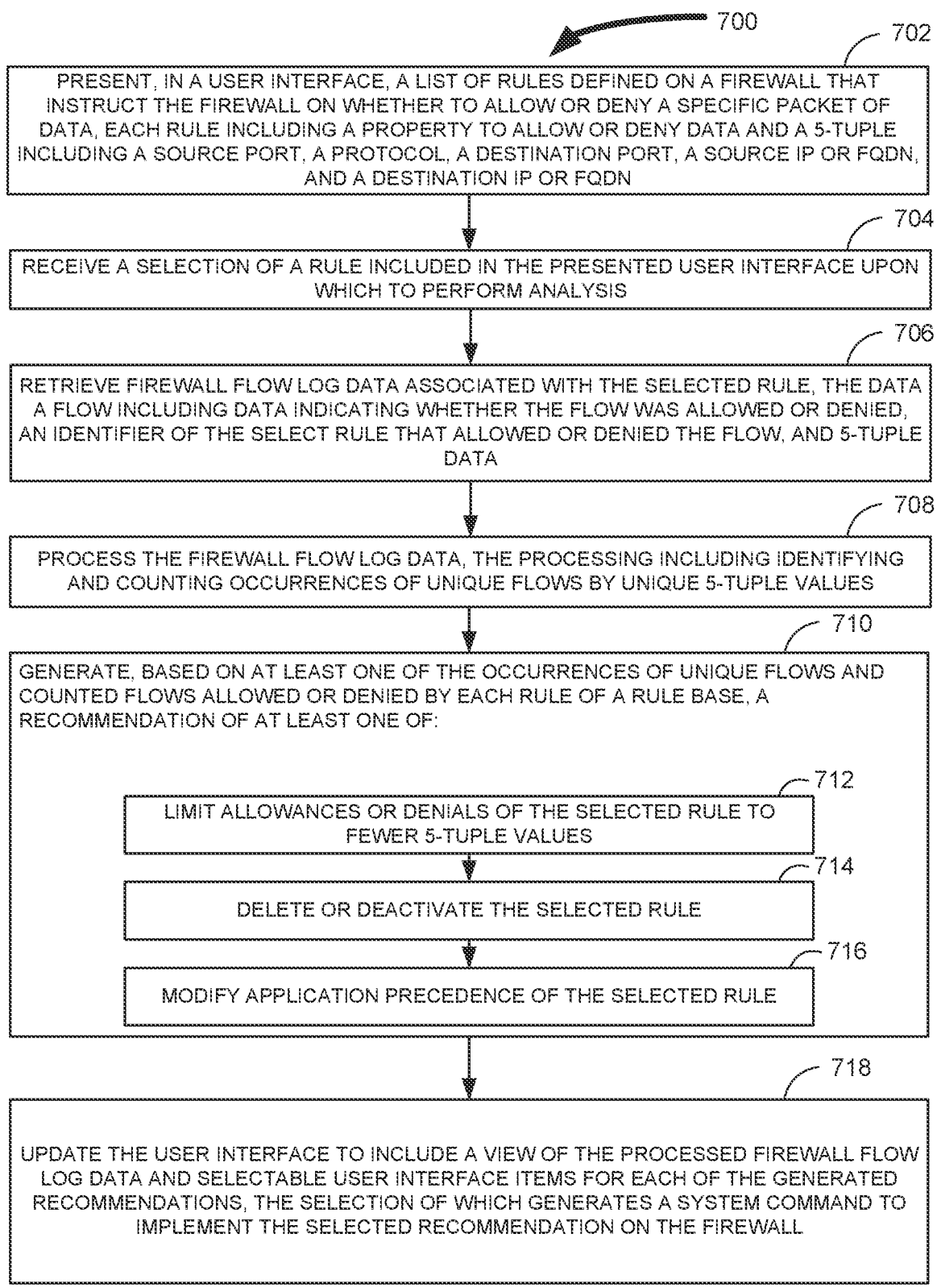
FIG. 7 is a block flow diagram of a method, according to an example embodiment.

FIG. 7 is a block flow diagram of a method, according to an example embodiment. The method 700 is an example of a method performed for firewall rule and data flow analysis and modification, according to some embodiments.

The method 700 includes presenting 702, in a user interface either in data renderable on another device or on a device performing the method, a list of rules defined on a firewall that instruct the firewall on whether to allow or deny a specific packet, i.e., a flow, of data. In such embodiments, each rule may include a property to allow or deny data and a 5-tuple including a source port, a protocol, a destination port, a source IP or FQDN, and a destination IP or FQDN.

The method 700 further includes receiving 704 a selection of a rule included in the presented user interface upon which to perform analysis. The method 700 then retrieves 706 firewall flow log data associated with the selected rule. This retrieved 706 includes data indicating whether the flow was allowed or denied, an identifier of the select rule that allowed or denied the flow, and 5-tuple data. The retrieved 706 data is then processed 708 by identifying and counting occurrences of unique flows by unique 5-tuple values.

Subsequently, the method 700 generates 710, based on at least one of the occurrences of unique flows and counted flows allowed or denied by each rule of a rule base, a recommendation. The generated 710 recommendation may include one or more of limiting 712 allowances or denials of the selected rule to fewer 5-tuple values, deleting 714 or deactivating the selected rule, and modifying 716 application precedence of the selected rule. The user interface may then be updated 718 to include a view of the processed 708 firewall flow log data and selectable user interface items for each of the generated 710 recommendations, the selection of which generates a system command to implement the selected recommendation on the firewall.

Figure 8:
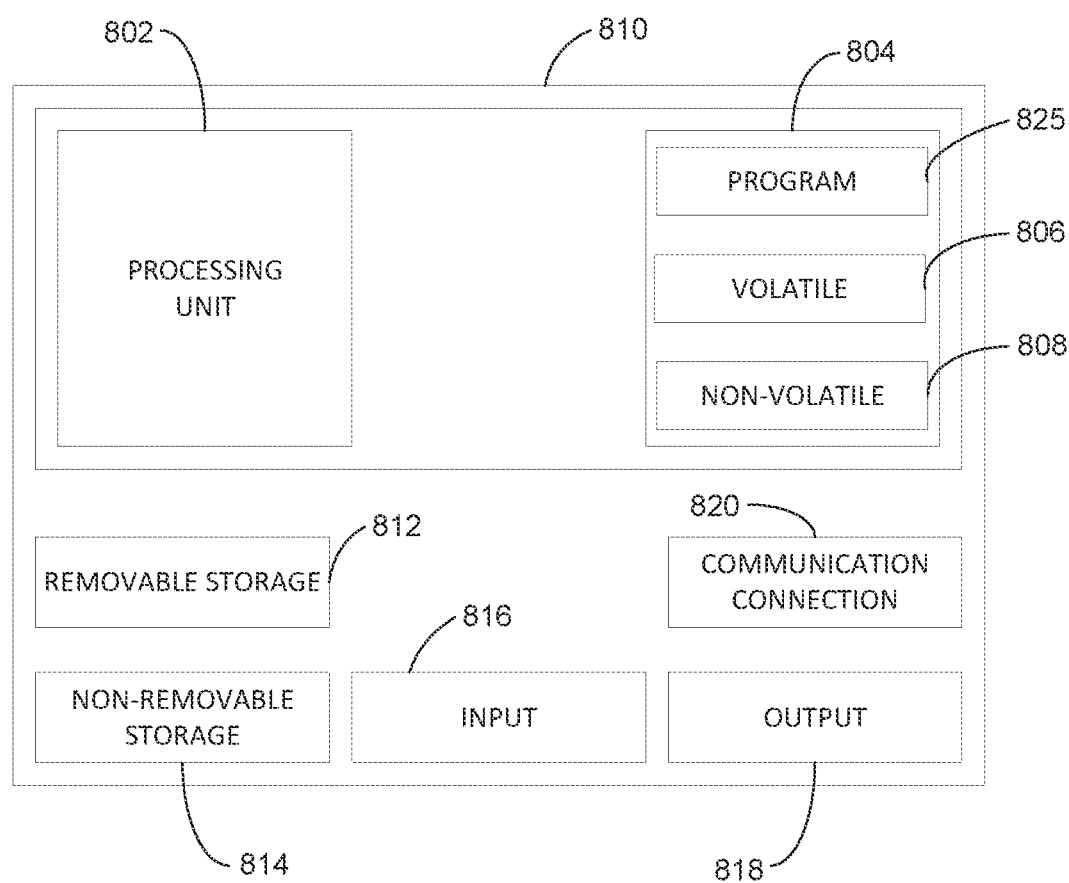
FIG. 8 is a block diagram of a computing device, according to an example embodiment.

FIG. 8 is a block diagram of a computing device, according to an example embodiment. In one embodiment, multiple such computer systems are utilized in a distributed network to implement multiple components in a transaction-based environment. An object-oriented, service-oriented, virtualized, or other architecture may be used to implement such functions and communicate between the multiple systems and components. One example computing device in the form of a computer 810, may include a processing unit 802, memory 804, removable storage 812, and non-removable storage 814. Although the example computing device is illustrated and described as computer 810, the computing device may be in different forms in different embodiments. For example, the computing device may instead be a smartphone, a tablet, smartwatch, or other computing device including the same or similar elements as illustrated and described with regard to FIG. 8. Devices such as smartphones, tablets, and smartwatches are generally collectively referred to as mobile devices and are relevant at least for embodiments herein where a user accesses firewall settings via a web browser or other user interface, such as a mobile device app for firewall configuration. Further, although the various data storage elements are illustrated as part of the computer 810, the storage may also or alternatively include cloud-based storage accessible via a network, such as the Internet.

Returning to the computer 810, memory 804 may include volatile memory 806 and non-volatile memory 808. Computer 810 may include—or have access to a computing environment that includes a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 810 may include or have access to a computing environment that includes input 816, output 818, and a communication connection 820. The input 816 may include one or more of a touchscreen, touchpad, mouse, keyboard, camera, one or more device-specific buttons, one or more sensors integrated within or coupled via wired or wireless data connections to the computer 810, and other input devices. The computer 810 may operate in a networked environment using a communication connection 820 to connect to one or more remote computers, such as database servers, web servers, and other computing device. An example remote computer may include a personal computer (PC), server, router, network PC, a peer device or other common network node, or the like. The communication connection 820 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 820 may also or alternatively include a transceiver device, such as a BLUETOOTH® device that enables the computer 810 to wirelessly receive data from and transmit data to other BLUETOOTH® devices. For example, the communication connection 820 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 802 of the computer 810. A hard drive (magnetic disk or solid state), CD-ROM, and RAM are some examples of articles including a non-transitory computer-readable medium. For example, various computer programs 825 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
retrieving firewall flow log data from a configurable time period and from a plurality of firewalls, each firewall associated with a firewall identifier of firewall identifiers, the firewall flow log data including data indicating whether a flow was allowed or denied, an identifier of a rule that allowed or denied the flow, and a five-tuple for the flow including a source port, a protocol, a destination port, a source IP or Fully Qualified Domain Name (FQDN), and a destination IP or FQDN;
processing the firewall flow log data, the processing including:
identifying and counting occurrences of unique flows, each unique flow corresponding to a unique five-tuple; and
counting the unique flows allowed or denied by each rule;
generating, based on at least one of the occurrences of unique flows and counted unique flows allowed or denied by each rule of a rule base associated with a subject firewall identifier of the firewall identifiers, a recommendation including limiting an existing rule to allow or deny fewer five-tuple values;
providing the recommendation within a user interface as a selectable option for implementation; and
changing, responsive to the selectable option being selected, the existing rule of the associated subject firewall to allow or deny fewer five-tuple values.

2. The method of claim 1, wherein:
the recommendation further includes a recommendation to modify a rule application precedence, the recommendation is generated by:
ordering rules in the rule base in descending order from a highest count of flows allowed or denied by a rule;
comparing the ordered rules with a current firewall rule application precedence configuration;
identifying a rule in the ordered rules that has a different location in the ordered rules than in the current firewall rule application precedence configuration; and
generating the recommendation for at least one rule to modify rule application precedence of the firewall rule application precedence configuration.

3. The method of claim 1, wherein the recommendation further includes a recommendation to delete an existing rule is identified when an existing rule has not been applied to allow or deny a flow for a configurable period.

4. The method of claim 1, wherein the recommendation further includes a recommendation to limit an existing rule and the recommendation is identified by:
identifying rules with allowance configurations that have been applied to allow flows to a number of source ports, protocols, destination ports, source IPs or FQDNs, and destination IPs or FQDNs; and
generating a recommendation to change the identified rules to only allow fewer unique flows.

5. The method of claim 1, wherein the method is performed in response to selection of a rule and the method is performed only with regard to the selected rule such that the firewall flow log data is retrieved only for flows allowed or denied by the selected rule.

6. The method of claim 1, wherein the user interface is a dataset renderable on a user device.

7. The method of claim 1, wherein the firewalls of the computing environment are deployed as software on virtual machines.

8. A method comprising:
presenting, in a user interface, a list of rules defined on a firewall that instruct the firewall on whether to allow or deny a specific packet of data, each rule including a property to allow or deny data and a 5-tuple data including a source port, a protocol, a destination port, a source IP or FQDN, and a destination IP or FQDN;
receiving, by the user interface, a selection of a rule included in the presented list of rules upon which to perform analysis;
retrieving firewall flow log data associated with the selected rule, the firewall flow log data from a configurable time period and from a plurality of firewalls, each firewall associated with a firewall identifier of firewall identifiers, the data of a flow included in the firewall flow log data including data indicating whether the flow was allowed or denied, an identifier of the select rule that allowed or denied the flow, and corresponding 5-tuple data;
processing the firewall flow log data, the processing including identifying and counting occurrences of unique flows allowed or denied by the selected rule, the unique flows corresponding to unique 5-tuple values;
generating, based on at least one of the occurrences of unique flows and counted flows allowed or denied by the selected rule associated with a subject firewall identifier of the firewall identifiers, a recommendation including limiting allowances or denials of the selected rule to fewer 5-tuple values;
updating the user interface to include a view of the processed firewall flow log data and selectable user interface items for each of the generated recommendations, the selection of which generates a system command to implement the selected recommendation on the firewall; and
changing, responsive to the selection of a user interface item of the user interface items associated with a recommendation, the selected rule of the associated subject firewall to allow or deny fewer five-tuple values.

9. The method of claim 8, wherein the 5-tuple is extendable to include a range of at least one of IPs, ports, and protocols.

10. The method of claim 8, wherein the user interface is a dataset renderable on a user device.

11. The method of claim 8, wherein:
the recommendation includes a recommendation to modify a rule application precedence and the recommendation is generated by:
ordering rules in the rule base in descending order from a highest count of flows allowed or denied by a rule;
comparing a location of the selected rule in the ordered rules with a location of the selected rule in a current firewall rule application precedence configuration; and
generating the recommendation for the selected rule to modify the current firewall rule application precedence configuration to more closely match the ordered rules.

12. The method of claim 8, wherein the recommendation further includes a recommendation to delete or deactivate the selected rule and the recommendation is identified when the selected rule has not been applied to allow or deny a flow for a certain period.

13. The method of claim 8, wherein the recommendation to limit the selected rule is identified by:
identifying an allowance configuration of the selected rule that has been applied to allow flows to a number of source ports, protocols, destination ports, source IPs or FQDNs, and destination IPs or FQDNs; and
generating the recommendation to change the selected rule to allow fewer unique flows.

14. A system comprising:
a processor;
a network interface device; and
a memory storing instructions executable by the processor to perform data processing activities comprising:
generating user interface data renderable on a user device as a user interface to present a list of rules defined on a firewall that instruct the firewall on whether to allow or deny a specific packet of data, each rule including a property to allow or deny data based on a 5-tuple including a source port, a protocol, a destination port, a source IP or FQDN, and a destination IP or FQDN;
transmitting the user interface data to a user device via the network interface device;
receiving, via the network interface device, a selection of a rule included in the presented user interface upon which to perform analysis;
retrieving, via the network interface device, firewall flow log data associated with the selected rule, the firewall flow log data from a configurable time period and from a plurality of firewalls, each firewall associated with a firewall identifier of firewall identifiers, the data of a flow including data indicating whether the flow was allowed or denied, an identifier of the select rule that allowed or denied the flow, and 5-tuple data;
processing the firewall flow log data, the processing including identifying and counting occurrences of unique flows by unique allowed or denied by the selected rule, the unique flows corresponding to unique 5-tuple values;
generating, based on at least one of the occurrences of unique flows and counted flows allowed or denied by the selected rule associated with a subject firewall identifier of the firewall identifiers, a recommendation including limiting allowances or denials of the selected rule to fewer 5-tuple values; and
updating the user interface data, by transmitting further user interface data via the network interface device to the user device, to render a view of the processed firewall flow log data and selectable user interface items for each of the generated recommendations, the selection of which generates a system command to implement the selected recommendation on the firewall; and
changing, responsive to the selection of a user interface item of the user interface items associated with a recommendation, the selected rule of the associated subject firewall to allow or deny fewer five-tuple values.

15. The system of claim 14, wherein the 5-tuple is extendable to include a range of at least one of IPs, ports, and protocols.

16. The system of claim 14, wherein the user interface data is renderable within a web browser of the user device.

17. The system of claim 14, wherein:
the recommendation further includes a recommendation to modify rule application precedence, the recommendation is generated by:
ordering rules in the rule base in descending order from a highest count of flows allowed or denied by a rule;
comparing a location of the selected rule in the ordered rules with a location of the selected rule in a current firewall rule application precedence configuration; and
generating the recommendation for the selected rule to modify the current firewall rule application precedence configuration to more closely match the ordered rules.

18. The system of claim 14, wherein the recommendation further includes a recommendation to delete or deactivate the selected rule when the selected rule has not been applied to allow or deny a flow for a certain period.

19. The system of claim 14, wherein the recommendation to limit the selected rule is identified by:
identifying an allowance configuration of the selected rule that has been applied to allow flows to a number of source ports, protocols, destination ports, source IPs, and destination IPs; and
generating a recommendation to change the selected rule to only allow flows more closely limited to those involving fewer unique 5-tuple values.

* * * * *